United States Patent [19]

Mayer

[11] Patent Number: 5,318,005

[45] Date of Patent: Jun. 7, 1994

[54] APPARATUS FOR CUTTING PLATE-SHAPED WORKPIECES AND FOR EDGE PROCESSING THEREOF

[76] Inventor: Wolfgang Mayer, Nonntaler Hauptstrasse 102, A-5020 Salzburg, Austria

[21] Appl. No.: 960,090

[22] Filed: Oct. 9, 1992

[30] Foreign Application Priority Data

Oct. 17, 1991 [DE] Fed. Rep. of Germany ....... 4134273

[51] Int. Cl.$^5$ .......................... B23D 1/02; B25B 11/00
[52] U.S. Cl. .................................. 125/13.01; 51/235;
51/98 R; 269/21; 125/35
[58] Field of Search ................. 125/35, 13.01; 51/235,
51/283 E, 165.71, 165.77, 165.76, 165.9, 240
GB, 98 R, 277; 279/3; 269/20, 21, 309, 310, 43;
83/468.2, 467.1

[56] References Cited

U.S. PATENT DOCUMENTS

| | | | |
|---|---|---|---|
| 4,088,312 | 5/1978 | Frosch et al. | 269/21 |
| 4,656,791 | 4/1987 | Herrington et al. | 51/235 |
| 4,684,113 | 8/1987 | Douglas et al. | 269/21 |
| 4,723,766 | 2/1988 | Beeding | 269/21 |
| 4,805,887 | 2/1989 | Ray | 269/21 |
| 4,838,531 | 6/1989 | Corsi | 269/21 |
| 4,946,149 | 8/1990 | Greene | 269/21 |
| 5,120,033 | 6/1992 | Shoda | 269/21 |
| 5,163,793 | 11/1992 | Martinez | 269/309 |

FOREIGN PATENT DOCUMENTS

| | | |
|---|---|---|
| 948549 | 6/1974 | Canada . |
| 963801 | 3/1975 | Canada . |
| 2265390 | 5/1979 | Fed. Rep. of Germany . |

*Primary Examiner*—Bruce M. Kisliuk
*Assistant Examiner*—Bryan Reichenbach
*Attorney, Agent, or Firm*—Flynn, Thiel, Boutell & Tanis

[57] ABSTRACT

An apparatus for cutting a plate (2) and processing the edges of the cut piece parts (7, 8, 9) has a plate-shaped receiving means (1) for a multiplicity of singly drivable rams (14, 14') adapted to be moved in and out. The rough plate (2) out of which the piece parts (7, 8, 9) are to be cut is placed on the rams (14) in their retracted position, and the piece part (8) whose edges (12, 13) are to be processed is moved away from the other piece parts (7, 9) and the remaining piece (10) by moving the rams (14') into the extended position, so that its edges (12, 13) are freely accessible.

7 Claims, 1 Drawing Sheet

APPARATUS FOR CUTTING PLATE-SHAPED WORKPIECES AND FOR EDGE PROCESSING THEREOF

The present invention relates to an apparatus for cutting workpiece having at least one plane surface and for processing the edges of the cut piece parts.

When a marble tabletop is to be produced for a washstand for example, one nowadays proceeds as follows. The supplied marble slab of a given size is placed on a framing and then cut along the outer contour of the washstand top, the opening for the washbasin being cut out in the middle of the slab. The edges are then finished accurately to size along the outside and the opening, a profile cutter being used to provide them with a certain profile. The pieces are then processed further by grinding, polishing or the like. For this purpose the washstand top must be taken from the framing and propped up in such a way that the edges are readily accessible to the profile cutter. If a computer-controlled machine tool is used it must be adjusted to a reference point on the propped-up tabletop. In the same way other tabletops or objects are then cut out of the rest of the marble slab and processed.

One proceeds in the same way to produce plate-shaped workpieces of different sizes and shapes from a different plate-shaped starting material, for example glass, wood, metal or plastics.

The cutting of the workpiece and edge processing of these piece parts thus require numerous time-consuming and labor-intensive manipulations that at the same time involve the danger of the workpiece being damaged.

The invention is based on the problem of simplifying the cutting of a plate-shaped starting material and the processing of the edges of the cut piece parts.

The inventive apparatus is primarily intended for cutting plate-shaped workpieces. However it can also be used to cut other workpieces and process their edges. The only essential point is that the workpiece have at least one plane surface with which it lies against the rams.

The plate-shaped receiving means can be of right-angled design. Its size depends on the size of the plate-shaped starting material out of which the workpieces are cut. For marble and other stone slabs it is Generally sufficient to use a plate-shaped receiving means with a length of two to four meters and a width of one to two meters. The size of the plate-shaped receiving means depends on the size of the rough slabs to be processed.

The rams are expediently distributed uniformly over the plate-shaped receiving means. They can thus be disposed on the plate-shaped receiving means in a grid shape, i.e. at the intersecting points of right-angled coordinates, or along parallel diagonal lines or along concentric circles or in some other Grid or pattern.

The distance between the rams depends on the size of the smallest piece part. That is, the distance between the rams must be such that at least three rams attack even the smallest piece part so that it is safely borne by the rams and can be reliably pushed out by them from the rest of the plate-shaped starting material or the adjacent piece parts cut out of the plate-shaped starting material, thereby exposing its edges for processing by the edge processing tool.

The rams have a nonslip design at their ends attacking the workpiece so that the latter is fixed reliably on the rams during cutting and edge processing. Firm adhesion of the workpiece to the rams can be obtained by providing the end of each ram with a suction cup to be subjected to underpressure, or with a nonslip rubber support. For processing metal plates one can also use magnetic holders, and for soft materials such as wood or plastics one can use points that penetrate the plate surface.

The plate-shaped receiving means is generally disposed horizontally, i.e. formed as a table, in particular in the case of heavy workpieces. When lighter materials such as wooden boards or plastic plates are to be processed however, the plate-shaped receiving means can be disposed vertically. In this case the plate to be cut and the cut workpieces must likewise be held by the rams in a vertical position, which can be achieved for example if the rams bear suction cups to be subjected to underpressure. Suspended processing with the workpiece disposed below is also conceivable.

The inventive apparatus preferably cooperates with a computer- or numerically controlled machine tool for cutting the workpiece and processing the edges of the piece parts. The apparatus can also be operated manually, e.g. via a control panel. The rams of the inventive apparatus and the machine tool can thereby be controlled jointly by the same computer. If several piece parts are cut out of the starting plate and their edges processed with the computer-controlled machine tool, it suffices to align the machine tool with only one reference point on the starting plate.

The working head of the machine tool can be fitted with various tools, for example an end-milling cutter, drills and profile cutters for different edge widths and profiles, and grinding and polishing tools. The cutting of the piece parts out of the starting plate can be optimized by CAD.

The rams of the inventive apparatus can be controlled singly, i.e. moved in and out singly, so that the piece part whose edges are to be processed can be moved out from the remaining plate or the other cut workpieces disposed around it far enough for the edge processing tool of the machine tool to be able to process its edges without being impaired by the remaining plate.

The rams can for this purpose be designed as rods that are mounted in bearing bushes provided on the plate-shaped receiving means. However it is also possible to design the rams as threaded spindles. The operation of the rams can be e.g. pneumatic, hydraulic or electric.

To avoid having to provide each ram with a separate lifting means, which can be relatively expensive, the inventive apparatus preferably has a plate-shaped slide movable with respect to the receiving means on the side of the receiving means facing away from the workpiece for moving the rams from the moved-in to the moved-out position. Furthermore, a singly drivable locking means is provided for each ram. To move the rams attacking the cut piece part into the moved-out position, all rams and the slide can first be moved out toward each other by moving the receiving means. The locking means attacking the cut piece part whose edges are to be processed are then operated, whereupon the receiving means and the slide are moved away from each other so that the rams whose locking means have not been operated are moved back into the moved-in position, for example by gravity or a spring or the like.

That is, each ram is lockable in the moved-out position by the corresponding locking means when it has been pressed out of the plate-shaped receiving means by the lift of the plate-shaped slide or the lowering of the receiving means by the slide. At the same time, the motion of the rams with the plate-shaped slide has the advantage that all rams bearing the workpiece whose edges are to be processed are moved out the same distance.

When starting plates of difference thicknesses are used it is possible to give the rams a telescoped design. With natural stone slabs it is frequently the case that the two surfaces do not extend parallel but the slab is thinner at one end than at the other. In such cases the stone slab is preferably placed on the rams with its visible side, i.e. its polished side, so that the edge profile cutter produces a perfect edge profile joining the polished surface.

Instead, it is also possible to disposed the plate on the plate-shaped receiving means with its visible side upward. To bring the visible side into the horizontal position a plate-shaped stop that is parallel to the plate-shaped receiving means, i.e. horizontal, can be provided for example, against which the starting plate is pressed with the rams in such a way as to be aligned horizontally with its visible side.

In the following an embodiment of the inventive apparatus shall be explained in more detail with reference to the drawing, in which.

Figure 1:
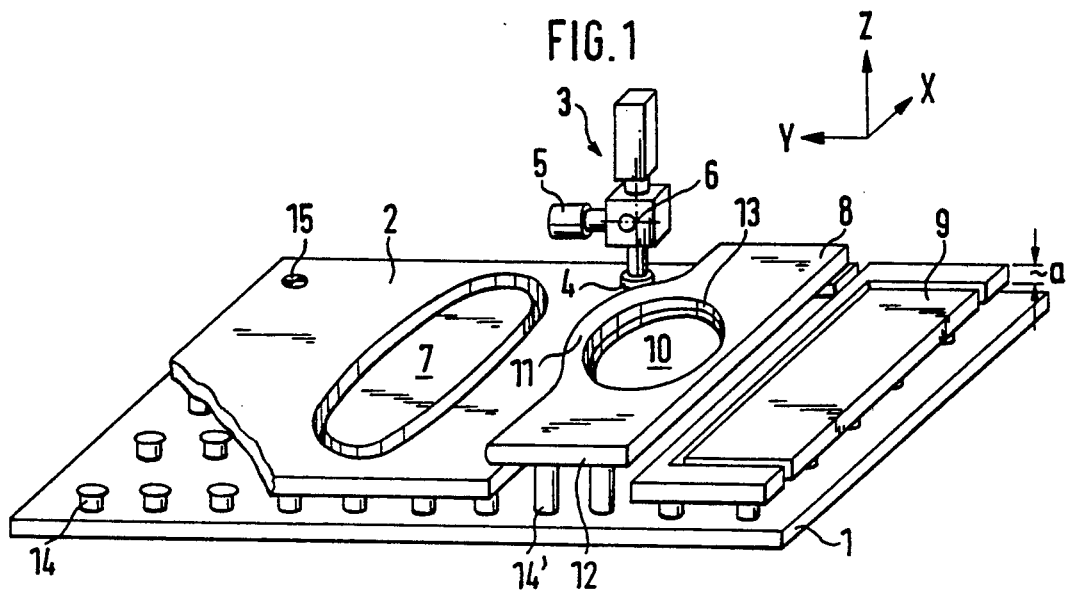
FIG. 1 shows a schematic perspective top view, with broken away parts, of the plate-shaped receiving means of the apparatus with several cut piece parts and one piece part being processed on the edge with a tool.

According to FIG. 1, a slab 2 e.g. made of marble is placed on a plate-shaped receiving means 1 formed as a table. Working head 3 of a computer-controlled machine tool not shown in any detail is disposed above slab 2 so as to be movable in the X, Y and Z directions. Working head 3 is fitted with several tools 4, 5 that can be swiveled into their working position by rotation about axis 6, whereby tool 4 swiveled into its working position in FIG. 1 is a profile cutter.

Three piece parts 7, 8 and 9 have previously been cut out of marble slab 2 with stone cutter 5, piece part 7 being an oval plate, piece part 8 a washstand top and piece part 9 a rectangular plate. Washstand top 8 is provided with a round opening 10 and a bulge 11 on one longitudinal edge in the area of opening 10.

While cut piece parts 7 and 9 are (still) located in the same plane as starting slab 2, piece part 8 (the washstand top) is raised above slab 2 and adjacent piece parts 7 and 9 such that profile cutter 4 can process outer edges 12 and inner edge 13. For this purpose part 8 must be raised at least by the height of edges 12, 13, i.e. at least thickness a of slab 2.

To raise part 8, or alternatively raise one of parts 7, 8 and 9 or remaining piece 10, plate-shaped receiving means 1 is provided with a multiplicity of uniformly distributed rams 14, 14'. While piece part 8 raised from slab 2 is disposed on moved-in position. Piece parts 7, 8, 9 need not be raised successively for their edges to be processed; spaced apart piece parts, such as parts 7 and 9, can also be raised simultaneously by rams 14 disposed therebelow since perfect edge access for tool 4 is still ensured then.

For cutting piece parts 7, 8, 9 out of starting slab 2 and for edge processing piece parts 7, 8, 9 the computer-controlled machine tool needs to be adjusted only once to a reference point 15.

Figure 2:
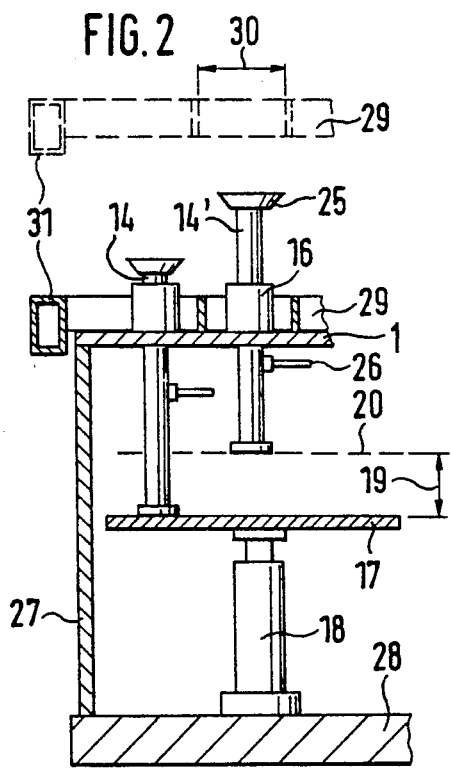
FIG. 2 shows a cross section through a side portion of the apparatus.

To permit each piece part 7, 8, 9 to be raised alternatively, rams 14 can be driven, i.e. moved out of receiving means 1, singly. According to FIGS. 2 and 3, rams 14 are thus formed as rods that are displaceably mounted in bearing bushes 16. A plate-shaped slide 17 is also provided below plate-shaped receiving means 1, being adapted to be raised and lowered by a cylinder 18, a spindle or another lifting means in the direction of arrow 19. When slide 17 has been raised from the lower position shown by continuous lines in FIG. 2 into the upper position shown by a broken line 20 in FIG. 2, all rams 14 are moved into the moved-out position, also ram 14 shown on the left in FIG. 2. In order that rams 14 bearing piece part 8 to be processed on edges 12, 13 according to FIG. 1 can remain moved out when slide 17 is moved back into the lower position, each ram 14 has a locking means 21 associated therewith that is shown on the right of FIG. 3 in more detail. It comprises an e.g. pneumatically, hydraulically or electrically operated short-stroke cylinder 22 whose lock 23 extending perpendicular to ram 14 engages one of several annular grooves 24 in ram 14 when ram 14 has been raised with slide 17 such that annular groove 24 is flush with lock 23. This locks ram 14 in the upper position, i.e. it remains in the moved-out position when slide 17 is lowered again with lifting cylinder 18, as illustrated by ram 14' shown on the right of FIG. 2. By contrast, nonlocked rams 14 move back into the moved-in position when slide 17 is lowered, as illustrated by ram 14 shown on the left of FIG. 2. One can also provide only one annular groove 24; but several annular grooves 24 have the advantage that ram 14 is lockable at different heights.

To ensure firm adhesion of piece parts 7, 8, 9 and the other plate portions to rams 14, each ram 14 is provided on its upper end with a suction cup 25 to be subjected to underpressure via a suction pipe 26.

Plate-shaped receiving means 1 is supported by feet or side walls 27 on a base plate 28 on which lifting means 18 is also mounted.

Figure 3:
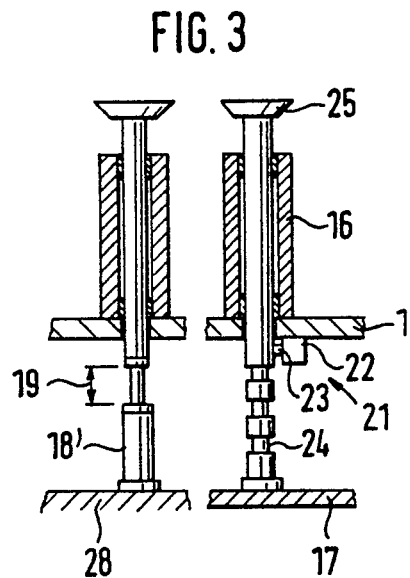
FIG. 3 shows a cross section through two differently designed rams.

In the embodiment shown on the left of FIG. 3 each ram 14 has a lifting means 18' associated therewith.

Figure 4A:
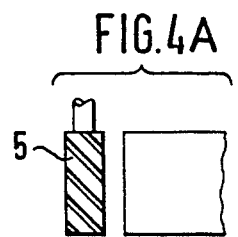
FIG. 4 shows two different cutters on the piece part.
Figure 4B:
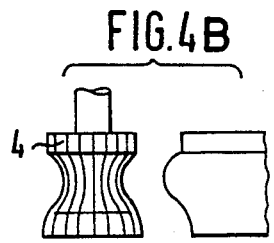

FIG. 4 shows on the left an end-milling cutter 5 and on the right a profile cutter 4 and the edge of the workpiece.

For depositing marble slab 2 on receiving means 1 with rams 14, a grate 29 can be provided. Grate 29 serves at the same time as a pallet for marble slab 2 to be supplied to receiving means 1 and is disposed, as shown by broken lines in FIG. 2, above rams 14 in such a way that rams 14 pass through openings 30 in grate 29 when the latter is lowered, as shown for grate 29 indicated by continuous lines in FIG. 2 in the position resting on receiving means 1. To be lowered onto receiving means 1, grate 29 can be pushed onto a lifting frame 31 extending around receiving means 1. Instead, grate 29 can also remain in the position shown by broken lines in FIG. 2, in which case rams 14 must be designed so as to move further out accordingly.

To cut pieces 7, 8, 9 out of a marble slab 2 and process their edges one can proceed with the inventive apparatus for example as follows. Marble slab 2 on grate 29 is pushed onto upwardly moved lifting frame 31, for example with a roller path, whereupon lifting frame 31 and thus grate 29 with marble slab 2 is lowered so that all rams 14 pass through openings 30. Marble slab 2 thus lies firmly on rams 14 provided with suction cups 25, while grate 29 lies on receiving means 1. Lifting means 18 is then operated to raise plate-shaped slide 17 into raised position 20 shown by broken lines so that all rams 14 are moved into the movedout position. Rams 14', that are disposed under piece part 8 to be processed on edges 12, 13 according to FIG. 1, are now locked with their corresponding locking means 21. Plateshaped slide 17 is then lowered into its lower position so that all rams 14 and thus slab 2 and piece parts 7 and 9 and remaining piece 10, but not locked rams 14' and thus piece part 8, are moved down again. Edges 12, 13 of piece part 8 are now exposed to be processed with profile cutter 4. After piece part 8 has been raised, oval remaining piece 10 is normally cut out with end-milling cutter 5 and then lowered for inner edge 13 to be processed with profile cutter 4.

To remove piece parts 7, 8, 9 and remaining piece 10 from table 1 after edge processing, a lifting means having a multiplicity of distributed, singly drivable suction cups can be positioned above table 1 so that one or more piece parts or remaining pieces can be cleared away simultaneously.

I claim:

1. An apparatus for processing an edge of a workpiece having at least one plane surface, comprising a plate-shaped receiving means for opposing a workpiece, a multiplicity of drivable rams which move between extended and retracted positions with respect to said plate-shaped receiving means, the at least one plane surface of the workpiece being engaged by opposed ones of said rams in said retracted position of said rams, the workpiece being movable with respect to said plate-shaped receiving means by motion of the workpiece engaging rams from said retracted position to said extended position through a distance corresponding at least to a height of the workpiece edge to be processed, a plate-shaped slide which moves with respect to said receiving means for moving the rams from said retracted position to said extended position, individually actuable locking means for locking respective rams with respect to said receiving means, whereby said workpiece engaging rams are moved into said extended position by first moving all said rams with said slide to said extended position with respect to said receiving means, then locking with respect to said receiving means the locking means of the workpiece engaging rams, and finally moving other said rams with said slide to said retracted position with respect to said receiving means, and processing means for processing an edge of the workpiece engaged by said workpiece engaging rams.

2. The apparatus of claim 1, including a base and in which the slide is movable with respect to said base.

3. The apparatus of claim 1, in which said rams have a nonslip design on ends engageable with a workpiece.

4. The apparatus of claim 1, including a grate provided as a support for the workpiece to be placed on the rams in the retracted position, the rams being movable through opening of the grate.

5. The apparatus of claim 1, wherein said processing means is a computer-controlled machine tool for edge processing of the workpiece.

6. The apparatus of claim 1, in which said rams are equidistant from each other on the receiving means.

7. An apparatus for processing an edge of a workpiece having at least one plane surface, said apparatus comprising an edge processing means for processing an edge of a workpiece, a plate-shaped receiving means for opposing the workpiece, a multiplicity of rams which move between an extended position and a retracted position with respect to said plate-shaped receiving means, the at least one plane surface of the workpiece opposing said receiving means and engaging workpiece engaging ones of said rams in their retracted position, the workpiece being movable into a processing position by motion of the workpiece engaging ones of said rams from said retracted position into said extended position and through a distance corresponding at least to a height of the edge of the workpiece, a slide movable with respect to the receiving means for moving all rams from said retracted position to said extended position, locking means for locking each ram with respect to said receiving means, the workpiece being moved into said processing position by first moving all rams with said slide from said retracted position into said position, then locking said extended, workpiece engaging rams with said locking means, and finally moving said slide away from said receiving means to move unlocked rams into the retracted position.

* * * * *

UNITED STATES PATENT AND TRADEMARK OFFICE
CERTIFICATE OF CORRECTION

PATENT NO. : 5 318 005
DATED : June 7, 1994
INVENTOR(S) : Wolfgang MAYER

It is certified that error appears in the above-indentified patent and that said Letters Patent is hereby corrected as shown below:

Column 6, line 15; change "opening" to ---openings---.

line 42; after "said" (second occurrence)
            insert ---extended---.

line 43; delete "extended,".

Signed and Sealed this

Eighteenth Day of October, 1994

Attest:

BRUCE LEHMAN

Attesting Officer      Commissioner of Patents and Trademarks